Sept. 12, 1939. C. T. WHITESCARVER 2,172,461
FORM CLAMP
Filed Aug. 24, 1936
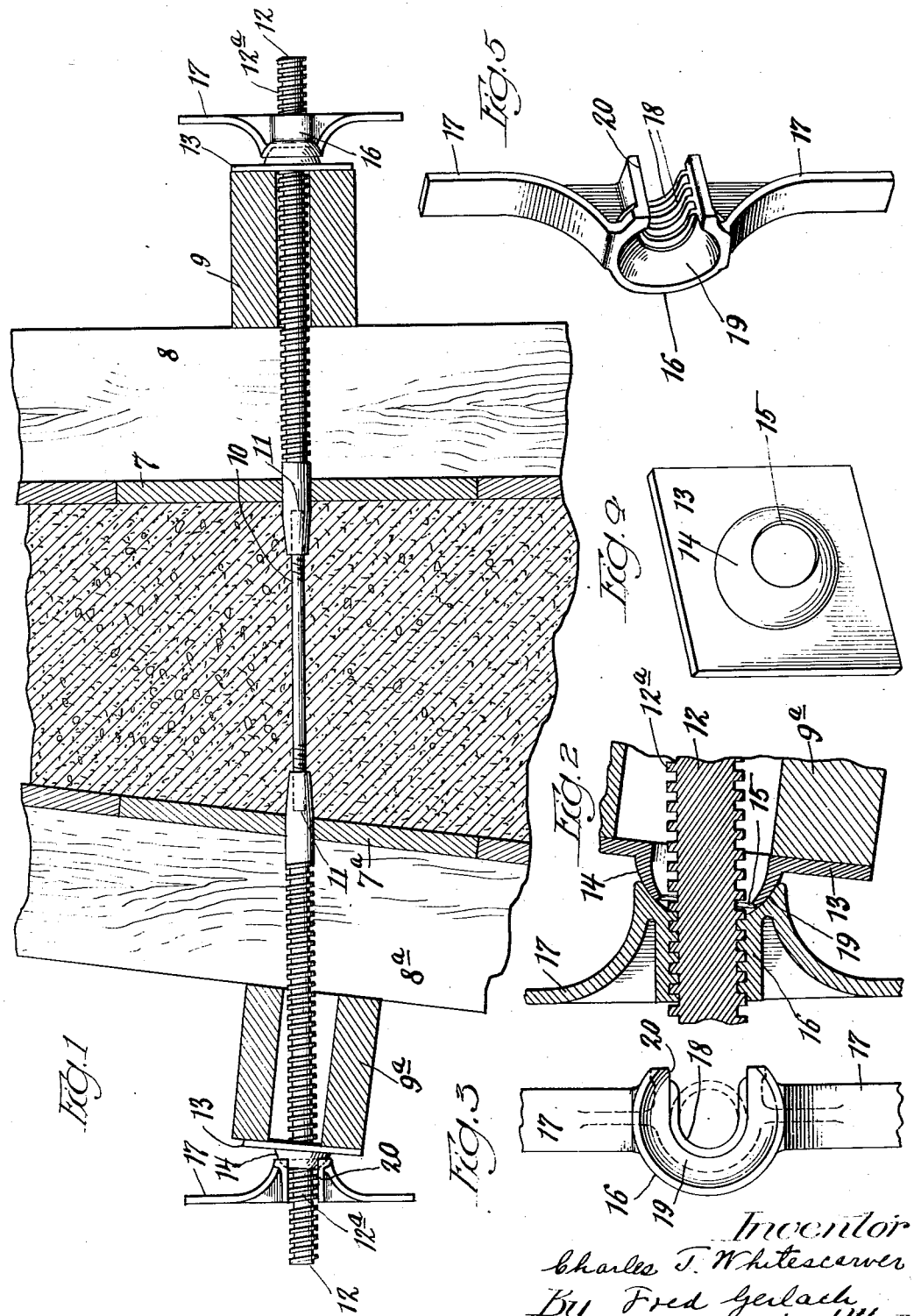
Inventor
Charles T. Whitescarver
By Fred Gerlach
his Atty Patented Sept. 12, 1939

2,172,461

UNITED STATES PATENT OFFICE 2,172,461

FORM CLAMP

Charles T. Whitescarver, Chicago, Ill., assignor to Anthony C. Fischer, Chicago, Ill.

Application August 24, 1936, Serial No. 97,546

1 Claim. (Cl. 85—32)

The invention relates to screw-clamps for use in connection with concrete wall-forms.

One object of the invention is to provide an improved form clamp of the screw-type which comprises nuts provided with open sides for expediting their application to and removal from the screw-rods, and bearing-plates with which the nuts will interfit when the nuts are tightened so that they will be secured in connected relation with or against transverse displacement from the screw-rods when the nuts are screwed up on the rods.

Another object of the invention is to provide an improved form-clamp of the screw-type with nuts which can be expeditiously applied to hold the form and which is adapted for use with forms for battered or straight walls.

Other objects of the invention will appear from the detailed description.

The invention consists in the several novel features which are hereinafter set forth and are more particularly defined by the claim at the conclusion hereof.

In the drawing:

Fig. 1 is a vertical section of a portion of a battered wall-form to which the improved form-clamp is applied. Fig. 2 is an enlarged section through one of the nuts and bearing-plates. Fig. 3 is a face-view of one of the nuts. Fig. 4 is a perspective of one of the bearing-plates. Fig. 5 is a perspective of one of the nuts.

The invention is exemplified in connection with a wall-form comprising a vertical side 7 and an inclined side 7a, battens 8, 8a, and wale-pieces 9 and 9a bearing against the battens 8, 8a respectively. The clamp comprises a rod 10 which is adapted to extend through the concrete between the form sides, and a pair of rods 12, the inner ends of which are provided with sockets 11 into which the ends of the rod 10 are screw-threaded. The portion of each rod 12 outside of the wall-sides is formed with an external screw-thread 12a. Bearing-plates 13 have inner faces which are adapted to engage wale-pieces 9, 9a respectively. Each plate 13 is provided with a central opening 15 through which a rod freely extends. Each plate is formed with an outwardly projecting central spherically convex portion 14. A nut is provided for the outer end of each rod 12. Each nut comprises a hub 16 with integral projecting handles 17 whereby the nut may be quickly and manually rotated. The hub has an open side or opening 20 in one of its sides to permit the nut to be slipped transversely onto one of the rods 12. The interior of the hub is provided with interrupted screw-ribs 18 to interfit with the thread 12a on the rod 12, the threads extending half way around the hub and laterally across the top and bottom side of opening 20 so that the thread of the nut may be brought into engagement with the screw-ribs on the rod by transverse movement of the nut and without rotation around the rod. The working side of the hub 16 of the nut is provided with a spherically concave portion 19 which is adapted to receive and bear against the spherically convex portion 14 of the bearing-plate 13.

In operation, the form is erected in usual manner and the screw-rod 10 and rods 12, in assembled relation, are extended through the sides of the form, the battens 8, 8a and wale-pieces 9, 9a. The bearing-plates 13 are then slipped over the ends of the rods 12 and held against the battens. The nuts are then slipped transversely onto the outer portions of the rods 12 beyond the bearing-plates so the screw-ribs 18 will interfit with the thread 12a of the rods 12. This can be done immediately outwardly of the spherically convex portions 14 of the bearing-plates. The nuts are then drawn up and the threaded engagement between them and the rods will draw the nuts inwardly so that the spherically convex portions 14 of the bearing-plates will pass into and interfit with the spherically concave portions 19 of the nuts. When the nuts have been drawn up tightly against the bearing-plates, they will hold the sides of the form together and the interfit between the spherical portions of the bearing-plates and the nuts will serve to lock the nuts against transverse displacement from the rods. The concave portion 19 of the nut extends over more than 180° so that the nut and plate will be locked together against relative movement. The spherically convex portions 14 of the bearing-plates and the spherically concave portions 19 of the nuts adapt the clamp for use on walls with parallel sides and also on battered walls or walls having one of their faces inclined with respect to the other without the use of wedges between the battens and the nuts, so that the clamp is usable universally on different forms of walls.

The invention exemplifies a screw-clamp for a concrete wall-form which includes quickly detachable or open-sides nuts and bearing-plates which are adapted to interfit with the nuts to secure the latter against transverse displacement. The invention also exemplifies a screw-clamp of this type which is applicable to forms for battered walls without the use of wedges between the nuts and the wale-pieces.

The invention is not to be understood as restricted to the details set forth, since these may be modified within the scope of the appended claim, without departing from the spirit and scope of the invention.

Having thus described the invention, what I claim as new and desire to secure by Letters Patent is:

As a new article of manufacture, a clamp adapted for application to a screw rod with one end thereof projecting through and beyond a form, and comprising a bearing plate adapted to fit against the outer face of the form and provided with a hollow outwardly extending substantially hemispherical hub portion with a centrally disposed hole therein for the projecting end of the screw rod, and a nut adapted to clamp the bearing plate against the form and consisting of a handle equipped hub having an internally threaded bore for said projecting end of the screw rod and a side opening leading to the bore and adapted to permit the nut to be moved transversely in and out of threaded relation with said projecting end of the rod without rotation, and in addition said bore terminating in a substantially hemispherical socket at its inner end shaped conformably to the hemispherical hub portion of the bearing plate, the side opening leading from the bore of the hub extending continuously through the side wall of said hemispherical socket and intercepting an arc in said socket of somewhat less than 180°, whereby upon tightening of the nut against the plate said socket is adapted to receive said hemispherical hub portion regardless of any angularity of the plate with respect to the rod and to coact with said hub portion in such manner as to hold the nut against transverse displacement relative to the rod.

CHARLES T. WHITESCARVER.